United States Patent [19]

Burke

[11] Patent Number: 5,182,482

[45] Date of Patent: Jan. 26, 1993

[54] DYNAMOELECTRIC MACHINE HAVING IMPROVED VENTILATION

[75] Inventor: Robert R. Burke, Cincinnati, Ohio

[73] Assignee: Siemens Energy & Automation, Inc., Alpharetta, Ga.

[21] Appl. No.: 700,786

[22] Filed: May 15, 1991

[51] Int. Cl.$^5$ .............................................. H02K 5/00
[52] U.S. Cl. ......................................... 310/89; 310/58
[58] Field of Search ................... 310/89, 58, 59, 52, 310/60 R, 88

[56] References Cited

U.S. PATENT DOCUMENTS

| | | | |
|---|---|---|---|
| 1,351,294 | 8/1920 | Levin | 310/58 |
| 1,961,387 | 6/1934 | Pfleger | 310/59 |
| 2,074,067 | 3/1937 | Darnell | 310/58 |
| 2,429,903 | 10/1947 | Trickey | 310/54 |
| 2,777,079 | 1/1957 | Egglestone et al. | 310/58 |
| 2,886,721 | 12/1956 | Picozzi | 310/51 |
| 3,017,526 | 1/1962 | Luenberger | 310/59 |
| 3,035,192 | 9/1959 | Schaefer | 310/54 |
| 3,114,061 | 4/1961 | Michel et al. | 310/60 |
| 3,250,926 | 5/1966 | O'Reilly et al. | 310/60 |
| 3,514,647 | 5/1970 | Lipstein | 310/60 |
| 3,518,468 | 6/1970 | Wightman | 310/64 |
| 3,575,582 | 4/1971 | Covault | 319/368 |
| 3,591,816 | 6/1971 | Sakamoto et al. | 310/162 |
| 3,610,976 | 10/1971 | Wightman | 310/60 |
| 3,715,610 | 2/1973 | Brinkman | 310/54 |
| 3,761,748 | 9/1973 | Baumann et al. | 310/58 |
| 3,800,173 | 3/1974 | Rosenberry, Jr. | 310/59 |
| 3,858,068 | 12/1974 | Ward, Jr. | 310/59 |
| 4,119,873 | 10/1978 | Sakurai | 310/56 |
| 4,142,120 | 2/1979 | Hallerback | 310/59 |
| 4,356,146 | 10/1982 | Knappe et al. | 376/272 |
| 4,766,337 | 8/1988 | Parkinson et al. | 310/58 |
| 4,926,076 | 5/1990 | Nimura et al. | 310/68 D |
| 5,006,743 | 4/1991 | King et al. | 310/89 |

OTHER PUBLICATIONS

Siemens "500 Frame Motors" Brochures IMD-3229 May 1990 and; IMD-3230 May 1990.

*Primary Examiner*—Emanuel T. Voeltz
*Assistant Examiner*—Matthew Nguyen

[57] ABSTRACT

The present invention provides a dynamoelectric machine having an improved ventilation system including a housing using accurately sized openings which permit efficient intake and exhaust of coolant, while restricting inadvertent access to the interior of the housing without external attachments. The openings are integrally cast in the yoke and extend upwardly to prevent entry of precipitation.

17 Claims, 2 Drawing Sheets

DYNAMOELECTRIC MACHINE HAVING IMPROVED VENTILATION

BACKGROUND OF THE INVENTION

The present invention relates to a casting for housing dynamoelectric machines including an improved ventilation system.

In the construction and operation of dynamoelectric machines, such as a high speed induction motors, the housing or yoke casting often include exhaust vents to permit exit of the hot air from the inside of the machine. Often such "open" machines are intended for use in environments where they are exposed to precipitation including rain and snow, as well as airborne particles which present a hazard to machine parts. To minimize the entrance of precipitation and foreign objects and particles including operators' fingers, external devices such as louvers, grills, screens, and other similar attachments have been affixed to the housing to shield the openings. Also, various flow designs have been devised to allow ventilation of the interior of the machine, while protecting the machine from precipitation.

For example, the patentees of U.S. Pat. No. 4,766,337 state that ventilation in a dynamoelectric machine can be improved by providing an air inlet ring overlapping the gap between the frame member and the bearing bracket. The patentees state that incoming cooling air moves axially along the air inlet ring, past an air deflector and exits from the machine at a port located intermediate the ends of the frame member.

According to U.S. Pat. No. 3,610,976, a drip-proof electric motor can have a casing with air vents spaced near both ends and in the end walls.

The foregoing attempts to provide adequate ventilation for motors intended for outdoor use or other adverse environments often do not provide enough ventilation for high speed induction motors, for example.

SUMMARY OF THE INVENTION

The present invention provides a dynamoelectric machine such as a high speed electric motor having improved ventilation openings which permit efficient exhaust of coolant, while restricting access to the inside of the motor without external attachments.

The present invention provides a dynamoelectric machine comprising a cylindrical rotor mounted on a rotable shaft and a stator, surrounding the rotor, formed of a plurality of laminations. The machine also has a housing including first and second ends, and first and second sides. A bearing at each of the first and second ends journals the rotable shaft. The housing defines a substantially cylindrical chamber for mounting the stator, the rotor and the rotable shaft. The housing has a plurality of intake vents on the first and second ends of the housing permitting entry of coolant, such as air, into the chamber and a plurality of exhaust vents permitting exit of coolant from the chamber. In the first and second sides, the exhaust vents have openings extending into the housing in a generally upward direction which are sized to substantially prevent insertion of foreign objects into the openings and prevent entry of precipitation into the housing.

The invention, together with further objects and attendant advantages, will be best understood by reference to the following detailed description taken in conjunction with the drawings.

DETAILED DESCRIPTION OF THE PREFERRED EMBODIMENT

Figure 1:
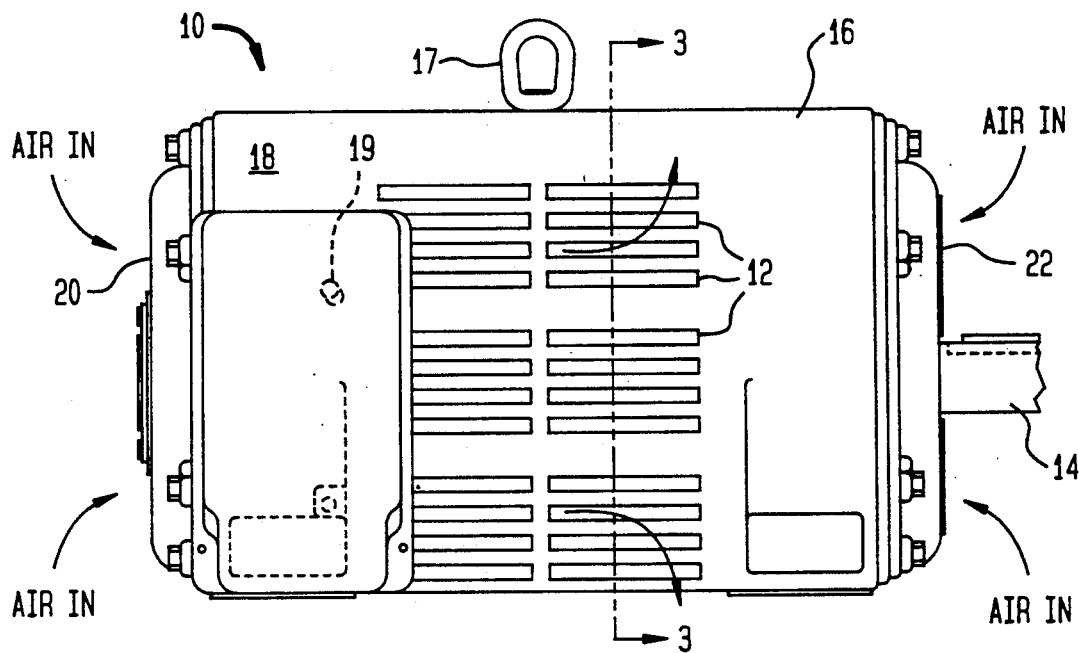
FIG. 1 is a front elevational view of a dynamoelectric machine including the improved ventilation vents of the present invention.

Referring to the drawings, FIG. 1 shows a front elevational view of a dynamoelectric machine 10, in this case a high speed induction motor, including the improved ventilation openings 12 of the present invention. The dynamoelectric machine 10 includes a cylindrical rotor (not shown) mounted on a rotable shaft 14, a stator (not shown) surrounding the rotor, and formed of a plurality of laminations.

This preferred embodiment includes a housing 16 including a cast yoke 18 and a pair of bearing brackets 20, 22 bolted to first and second ends of the yoke is. Preferably, the housing 16 has an eyelet 17 to permit the housing 16 to be lifted by a hoist or other lifting means. Mounted on the housing 16 is a terminal box 19. Optionally, the motor can be outfitted with a sound reduction device (not shown), such as is described in copending, coassigned U.S. application Ser. No. 07/700,300 filed on May 15, 1991 assignee docket 90E7561, the entire contents of which are incorporated by reference herein.

Figure 2:
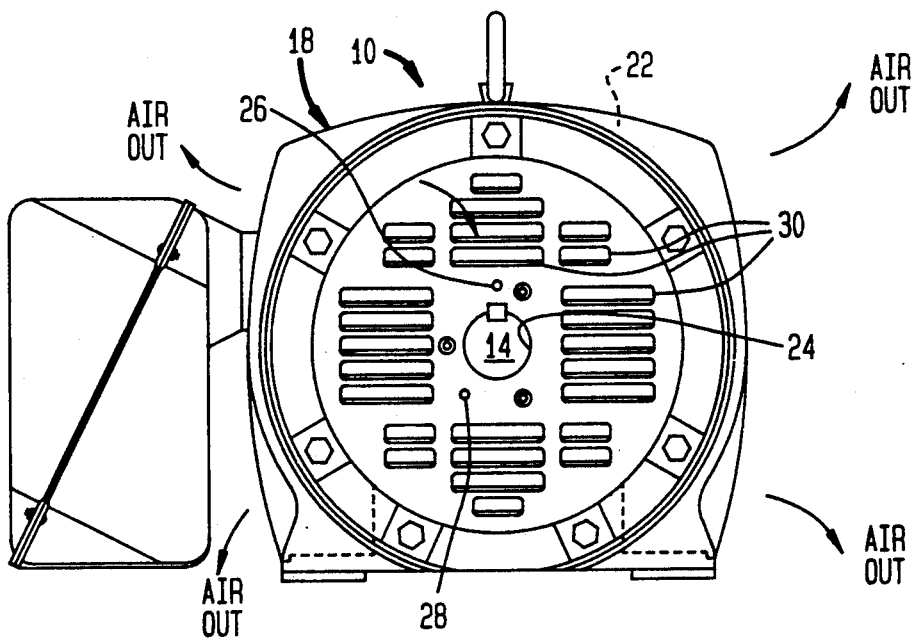
FIG. 2 is an end view of the dynamoelectric machine of FIG. 1.

FIG. 2 illustrates an end view of the preferred embodiment including a representative one of the cast bearing brackets 22 shown bolted to the cast yoke 18. Each cast bearing bracket 20, 22 includes an aperture 24 for the rotatable shaft 14, and includes grease inlet 26 and grease drain 28 openings. As shown in FIG. 2, the cast bearing bracket 22 has a plurality of intake vents 30 to permit entry of a coolant such as ambient air. Preferably, as shown in FIG. 2, the intake vents 30 are arrayed on all sides of the aperture 24 in order to obtain maximum intake volume.

Figure 3:
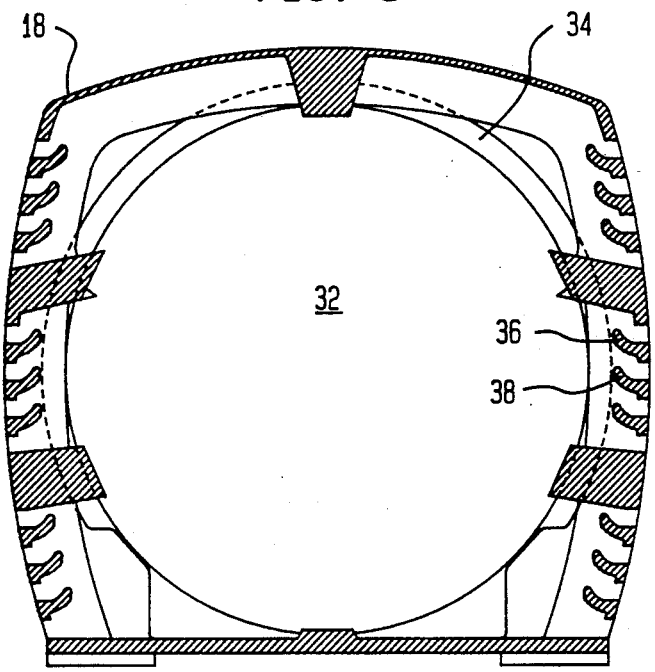
FIG. 3 is a cross-sectional view taken along line 3—3 of FIG. 1.
Figure 4:
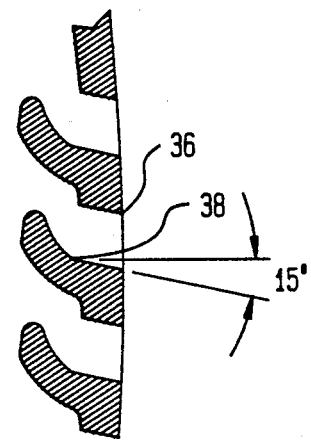
FIG. 4 is an enlarged partial view of the cross-section of FIG. 3.
Figure 5:
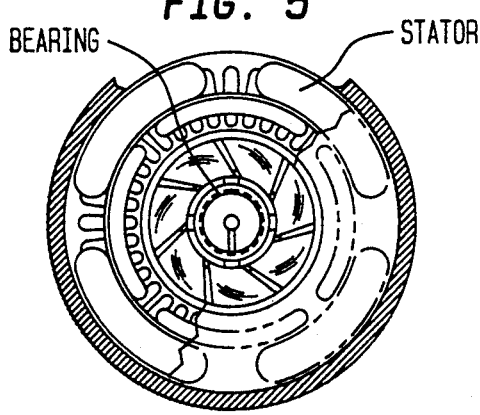
FIG. 5 is an end view partially in section and partially broken away of the dynamoelectric machine of FIG. 1.
Figure 6:
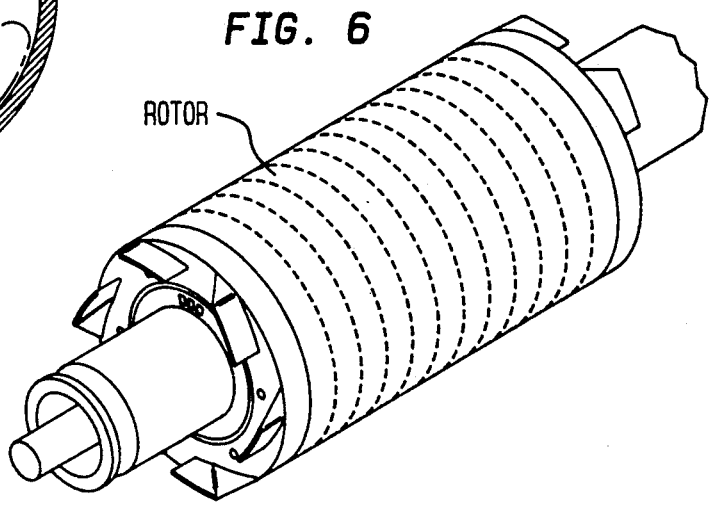
FIG. 6 is a perspective view of a rotor assembly for use in the dynamoelectric machine of FIG. 1.

Referring to FIGS. 1 and 3, the cast yoke 18 includes a plurality of exhaust ventilation openings 12 preferably arrayed in two rows of twelve vents on each of the first and send sides of the yoke 18 or housing 16. These exhaust vents 12 permit coolant air to exit from the interior of the housing 16. As shown in FIGS. 3 and 4, the exhaust vents 12 have openings extending into the housing 16 in a generally upward direction to substantially prevent entry of precipitation into the interior of the machine. The exhaust ventilation openings 12 are also sized to substantially prevent insertion of foreign objects such as fingers and many hand tools into the machine 10.

As shown in FIG. 3, which is a cross-section of the cast yoke 18, the interior of the housing 16 defines a substantially cylindrical chamber 32 into Which may be fitted the stator (not shown), the rotor (not shown), and the rotatable shaft 14 (FIG. 2). Preferably, the rotor mounted on each end of the rotor are end connectors having an array of fan blades as disclosed in copending, coassigned U.S. Pat. application Ser. No. 07,700,723 filed May 15, 1991 assignee docket no. 90E7562, the entire contents of which is incorporated herein by reference. As shown in FIGS. and 3, the exhaust ventilation openings 12 permit coolant (air) to exit from the cylindrical chamber 32 to the surrounding atmosphere. The cylindrical chamber 32 may be formed as part of the same casting as the yoke 18 or it may be formed by mounting a separately formed cylindrical sleeve 34 inside the cast yoke 18, as shown in FIG. 3.

An important aspect of the present invention is the size and shape of the exhaust ventilation openings 12. As shown in FIG. 4, each exhaust ventilation opening 12 is formed by adjacent top 36 and bottom 38 surfaces in the cast yoke 18. Still referring to FIG. 4, the exhaust ventilation openings 12 are preferably less than about 0.75 inch in height, i.e. measured from the top surface 36 to the bottom surface 35 in order to keep out a cylindrical rod of 0.75 inch in diameter, as specified in National Electrical Manufacturers' Association standard for a type I weather protected machine (see NEMA Standards, para. 1.25.8.1, incorporated by reference herein).

Preferably, the exhaust ventilation openings 12 extend from the exterior surface, where they communicate with the surrounding atmosphere, into the substantially cylindrical chamber 32 in a generally upward direction. Preferably, the tangent to the bottom surface 38 of the exhaust ventilation openings 12 forms an angle between about 10° and about 20°. The particular angle varies according to the particular end use, the ventilation efficiency needed, and the amount of weather and precipitation protection desired. As a person of ordinary skill knows, the design of the exhaust ventilation openings 12 (and indeed the intake vent openings 30), involves choosing the appropriate angle of ingress, the size of each ventilation opening, and the number of ventilation openings. Preferably, the angle should be about 15, in order to keep most forms of precipitation and foreign particles from entering the machine 10. Also, as shown in FIG. 4, the exhaust ventilation openings 12 should preferably Widen past the exterior surface to permit more rapid and efficient circulation of coolant or air.

The yoke 18 and each of the bearing brackets 20, 22 should preferably be cast using a method which permits accurate control of the size and shape of the exhaust ventilation openings 12. For example, the yoke 18 should be cast using a sand-phenolic mixture, hardening in air to a mold, which is a conventional casting technique, and has been found to give controllable results.

It should be apparent from the foregoing that a dynamoelectric machine has been described including a housing having an efficient ventilation system using accurately sized openings in the housing to allow air to enter and exit freely, while providing protection against the entry of precipitation and unwanted foreign objects and particles.

Various modifications and changes to the preferred embodiment described above will be apparent to those skilled in the art. Such changes and modifications can be made without departing from the spirit and scope of the present invention, and it is therefore intended that such changes and modifications be covered by the following claims including all equivalents.

What is claimed is:

1. A dynamoelectric machine comprising:
   a cylindrical rotor mounted on an elongated rotatable shaft;
   a stator, surrounding the rotor, formed of a plurality of laminations;
   a housing including first and second ends and fist and second sides, each of the first and second ends having a bearing to journal the rotatable shaft, the housing defining a substantially cylindrical chamber for mounting the stator, the rotor and the rotatable shaft;
   a plurality of intake ventilation openings on the first and second ends of the housing permitting entry of coolant air into the chamber; and
   a plurality of exhaust ventilation openings integrally formed on at least one of the first and second sides of the housing permitting exit of coolant air from the chamber, the exhaust ventilation openings extending into the housing in a direction generally normal to an outer surface of the housing side that is proximal the opening, the integrally formed opening thereafter sweeping generally tangentially distal the surface int a generally upwardly direction relative to the housing surface and the opening further being sized substantially to prevent insertion of foreign objected into the exhaust ventilation openings.

2. A dynamoelectric machine in accordance with claim 1, wherein the first and second ends are cast bearing brackets mounted to a cast yoke including the first and second sides.

3. A dynamoelectric machine in accordance with claim 2, wherein intake and exhaust ventilation openings substantially prevent entry of precipitation into the chamber.

4. A dynamoelectric machine comprising:
   a cylindrical rotor mounted on an elongated rotatable shaft;
   a stator surrounding the rotor, formed of a plurality of laminations;
   a cast yoke having fist and second sides and defining a substantially cylindrical chamber for surrounding the stator, the rotor and the rotatable shaft;
   first and second cast bearing brackets mounted on first and second ends of the yoke for relatively capturing the elongated bearing shaft;
   each of the first and second sides having rows of exhaust ventilation openings integrally formed therein permitting exit of coolant from the chamber each of the exhaust ventilation openings extending from an exterior surface of the housing into the chamber in a direction generally normal to an outer surface of one of the first and second sides that is proximal the openings, the integrally formed opening thereafter sweeping generally tangentially distal the surface in a generally upwardly direction relative to the respective housing surface to permit exit of coolant from the chamber, while substantially avoiding entry of precipitation and foreign objects into the chamber.

5. A dynamoelectric machine in accordance with claim 4 wherein each of the first and second sides have exhaust vents arranged in first and second rows.

6. An dynamoelectric machine in accordance with claim 5, wherein each of the exhaust ventilation openings in the exterior surface is sized to prevent the passage of a cylindrical rod of at least about 0.75 inch in diameter.

7. A dynamoelectric machine in accordance with claim 6, wherein each of the exhaust ventilation openings has a bottom surface that is generally normal to the respective outer surface side and the sweeping portion thereof forms an angle of between about 10° and 20° with a tangent to the bottom surface of each of the exhaust ventilation openings.

8. A dynamoelectric machine in accordance with claim 7, wherein each of the exhaust ventilation openings widens as the opening extends in the generally upwardly direction distal the outer surface of the respective side.

9. A dynamoelectric machine comprising:
a cylindrical rotor mounted on an elongated rotatable shaft;
a stator, surrounding the rotor, formed f a plurality of laminations;
a housing including first and second ends and first and second sides, each of the first and second ends having a bearing to journal the rotatable shaft, the housing defining a substantially cylindrical chamber for mounting the stator, the rotor and the rotatable shaft;
a plurality of intake ventilation openings on the first and second ends of the housing for permitting entry of coolant air into the chamber; and
a plurality of integrally formed exhaust ventilation openings integrally formed on the fist and second sides of the housing for permitting exit of coolant air from the chamber, the exhaust ventilation openings extending into the housing in a direction generally normal to an a outer surface of the housing side that is proximal the opening, the integrally formed opening thereafter sweeping generally tangentially distal the surface in a generally upwardly direction relative to the housing surface the the opening further being sized substantially to prevent insertion of foreign objects into the exhaust ventilation openings.

10. A dynamoelectric machine in accordance with claim 9, wherein the first and second ends are cast bearing brackets mounted to a cast yoke including the first and second sides.

11. A dynamoelectric machine in accordance with claim 9 wherein each of the first and second sides have exhaust ventilation openings arranged in fist and second rows.

12. A dynamoelectric machine in accordance with claim 11, wherein each of the exhaust ventilation openings in the exterior surface is sized to prevent the passage of a cylindrical rod of at least about 0.75 inch in diameter.

13. A dynamoelectric machine in accordance with claim 12, wherein each of the exhaust ventilation openings has a bottom surface that is generally normal to the respective outer surface side and the sweeping portion thereof forms an angle of between about 10° and 20° with a tangent to the bottom surface of each of the exhaust ventilation openings.

14. A dynamoelectric machine in accordance with claim 13, wherein each of the exhaust ventilation openings widens as the opening extends in the generally upwardly direction distal the outer surface of the respective side.

15. A dynamoelectric machine in accordance with claim 9, wherein each of the exhaust ventilation openings in the exterior surface is sized to prevent the passage of a cylindrical rod of at least bout 0.75 inch in diameter.

16. A dynamoelectric machine in accordance with claim 9, wherein each of the exhaust ventilation openings has a bottom surface that is generally normal to the respective outer surface side and the sweeping portion thereof forms an angel of between about 10° and 20° with a tangent to the bottom surface of each of the exhaust ventilation openings.

17. A dynamoelectric machine in accordance with claim 9, wherein each of the exhaust ventilation openings widens as the opening extends in the generally upwardly direction distal the outer surface of the respective side.

* * * * *